(12) United States Patent
Ding et al.

(10) Patent No.: US 11,805,322 B2
(45) Date of Patent: *Oct. 31, 2023

(54) IMAGE DEVICE AUTO EXPOSURE

(71) Applicant: Snap Inc., Santa Monica, CA (US)

(72) Inventors: Bo Ding, Los Angeles, CA (US);
Dmitry Ryuma, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,160

(22) Filed: Mar. 9, 2022

(65) Prior Publication Data

US 2022/0201185 A1 Jun. 23, 2022

Related U.S. Application Data

(63) Continuation of application No. 16/939,369, filed on Jul. 27, 2020, now Pat. No. 11,303,819, which is a continuation of application No. 15/962,314, filed on Apr. 25, 2018, now Pat. No. 10,757,342.

(51) Int. Cl.
*H04N 23/73* (2023.01)
*G03B 7/093* (2021.01)
*G03B 17/48* (2021.01)
*G02B 27/01* (2006.01)

(52) U.S. Cl.
CPC ............ *H04N 23/73* (2023.01); *G03B 7/093* (2013.01); *G03B 17/48* (2013.01); *G02B 2027/0138* (2013.01)

(58) Field of Classification Search
CPC .. H04N 5/2353; H04N 5/2352; H04N 5/2351; G03B 7/093; G03B 17/48; G02B 2027/0138; G02B 27/017; G02B 2027/0178
See application file for complete search history.

(56) References Cited

U.S. PATENT DOCUMENTS

| | | | | |
|---|---|---|---|---|
| 10,757,342 | B1* | 8/2020 | Ding | G03B 17/48 |
| 11,303,819 | B1* | 4/2022 | Ding | H04N 23/73 |
| 2006/0164533 | A1* | 7/2006 | Hsieh | H04N 25/53 |
| | | | | 348/E5.037 |
| 2006/0170787 | A1* | 8/2006 | Bentkovski | H04N 23/74 |
| | | | | 348/222.1 |
| 2012/0194419 | A1 | 8/2012 | Osterhout et al. | |
| 2012/0212414 | A1 | 8/2012 | Osterhout et al. | |
| 2013/0278631 | A1 | 10/2013 | Border et al. | |
| 2016/0316132 | A1* | 10/2016 | Kinoshita | H04N 25/533 |
| 2019/0253623 | A1* | 8/2019 | Lim | H04N 9/73 |

* cited by examiner

*Primary Examiner* — Nhan T Tran
(74) *Attorney, Agent, or Firm* — Culhane Meadows PLLC; Stephen J. Weed

(57) ABSTRACT

Imaging methods and imagers for image capture devices. Still images are captured by gathering ambient light data using an ambient light sensor of the image capture device, selecting a frame rate for the imager corresponding to the gathered ambient light data, determining optimal image capture parameters for the imager by executing an auto exposure algorithm with a processor using the selected frame rate as an initialization parameter for the auto exposure algorithm, and capturing a still image with the imager after execution of the auto exposure algorithm using the selected frame rate.

18 Claims, 8 Drawing Sheets

IMAGE DEVICE AUTO EXPOSURE

CROSS-REFERENCE TO RELATED APPLICATIONS

This application is a continuation of U.S. application Ser. No. 16/939,369 filed Jul. 27, 2020, which is a continuation of U.S. application Ser. No. 15/962,314, filed Apr. 25, 2018, now U.S. Pat. No. 10,757,342, both of which are incorporated herein by reference in their entirety.

TECHNICAL FIELD

The present subject matter relates to camera auto exposure methods and cameras employing such methods.

BACKGROUND

In certain products, especially mobile devices, power consumption is always a challenge when designing an electronic system. The system can be designed in such a way so that it turns on and/or functions only after certain commands (button press, voice command, etc.). Such systems may improve power performance by shutting down or switching to a deep sleep mode after the command is executed. Delays may occur when transitioning into normal operating modes, e.g., to take a picture.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
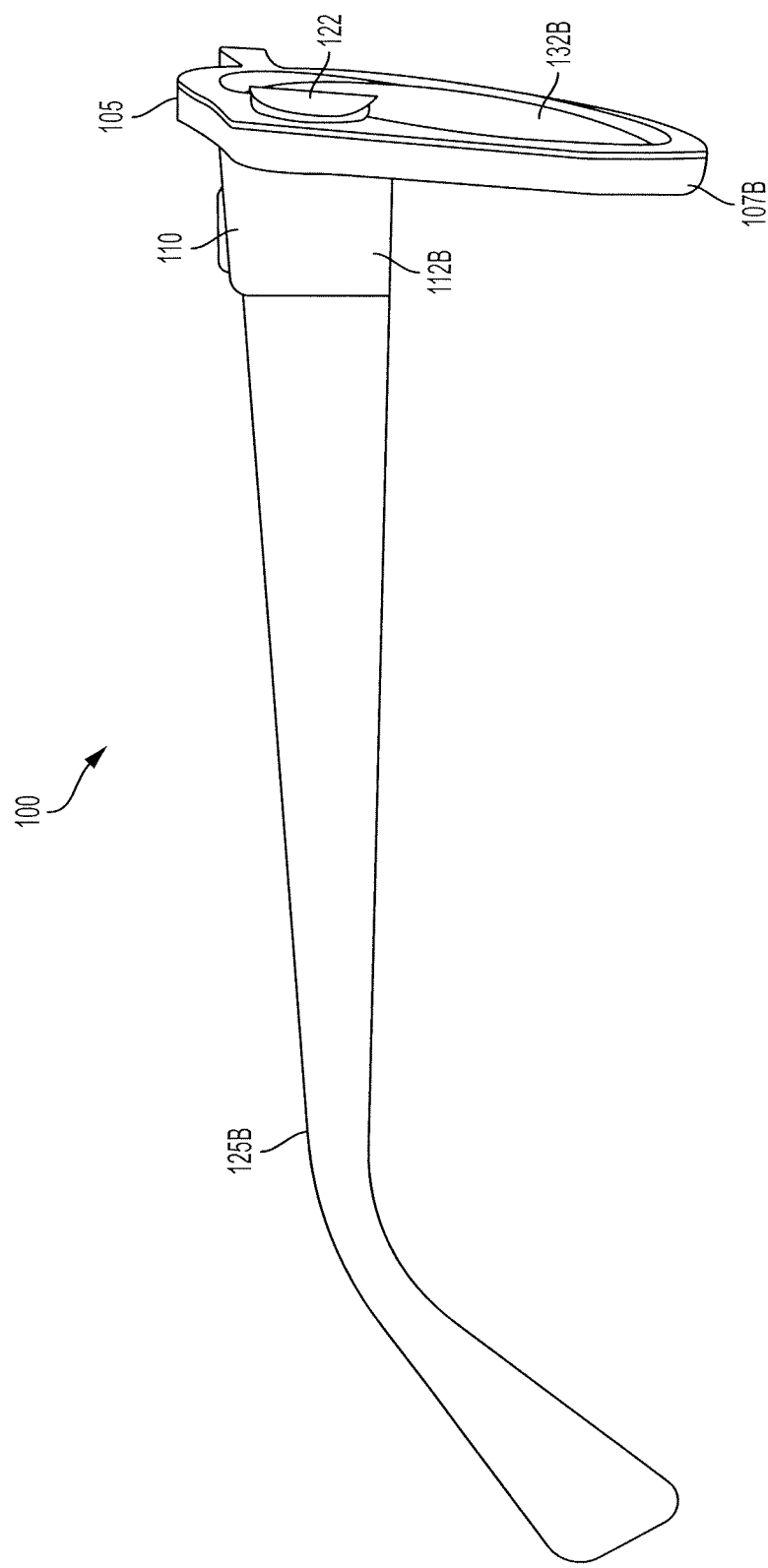
FIG. 1A is a side view of an example image capture device configured as an eyewear device in accordance with aspects of the invention.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

In an example, an auto exposure method for an image capture device includes the steps of gathering ambient light data using an ambient light sensor of the image capture device, selecting a frame rate corresponding to the gathered ambient light data, and determining optimal image capture parameters including sensor gain and exposure time for the image capture device. The auto exposure method determines the optimal image capture parameters by executing an auto exposure algorithm with a processor using the selected frame rate as an initialization parameter for the auto exposure algorithm.

In another example, an image capture device includes an ambient light sensor configured to gather ambient light data, a processor configured to determine optimal image capture parameters including sensor gain and exposure time, and an imager controlled by the processor, the imager configured to capture an image using the optimal image capture parameters. The processor is configured to select a frame rate corresponding to the gathered ambient light data and determine an optimal image capture frame rate for the image capture device by executing an auto exposure algorithm with a processor using the selected frame rate as an initialization parameter for the auto exposure algorithm.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1B:
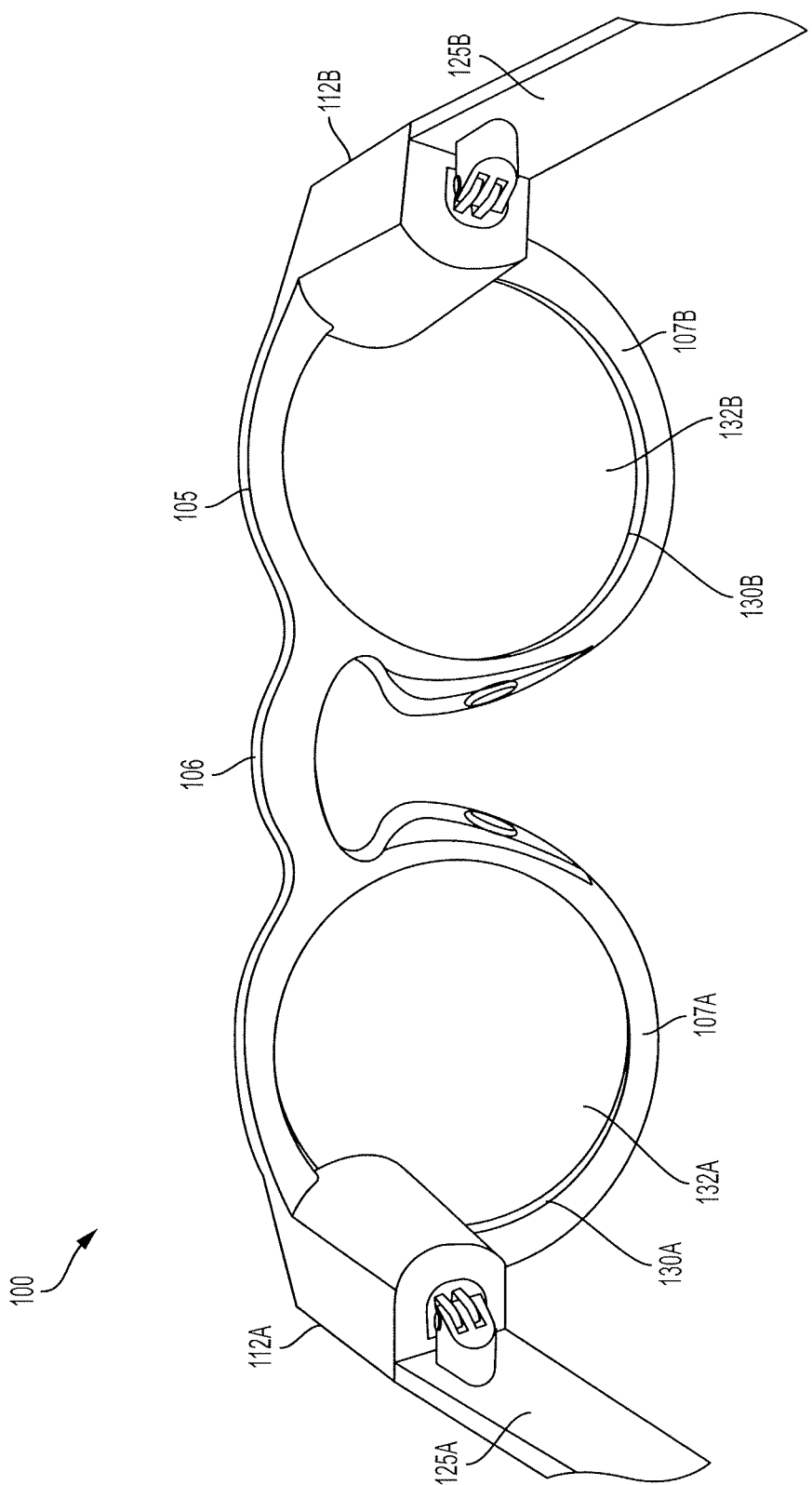
FIGS. 1B and 1C are rear views of the example image capture device of FIG. 1A.
Figure 1C:
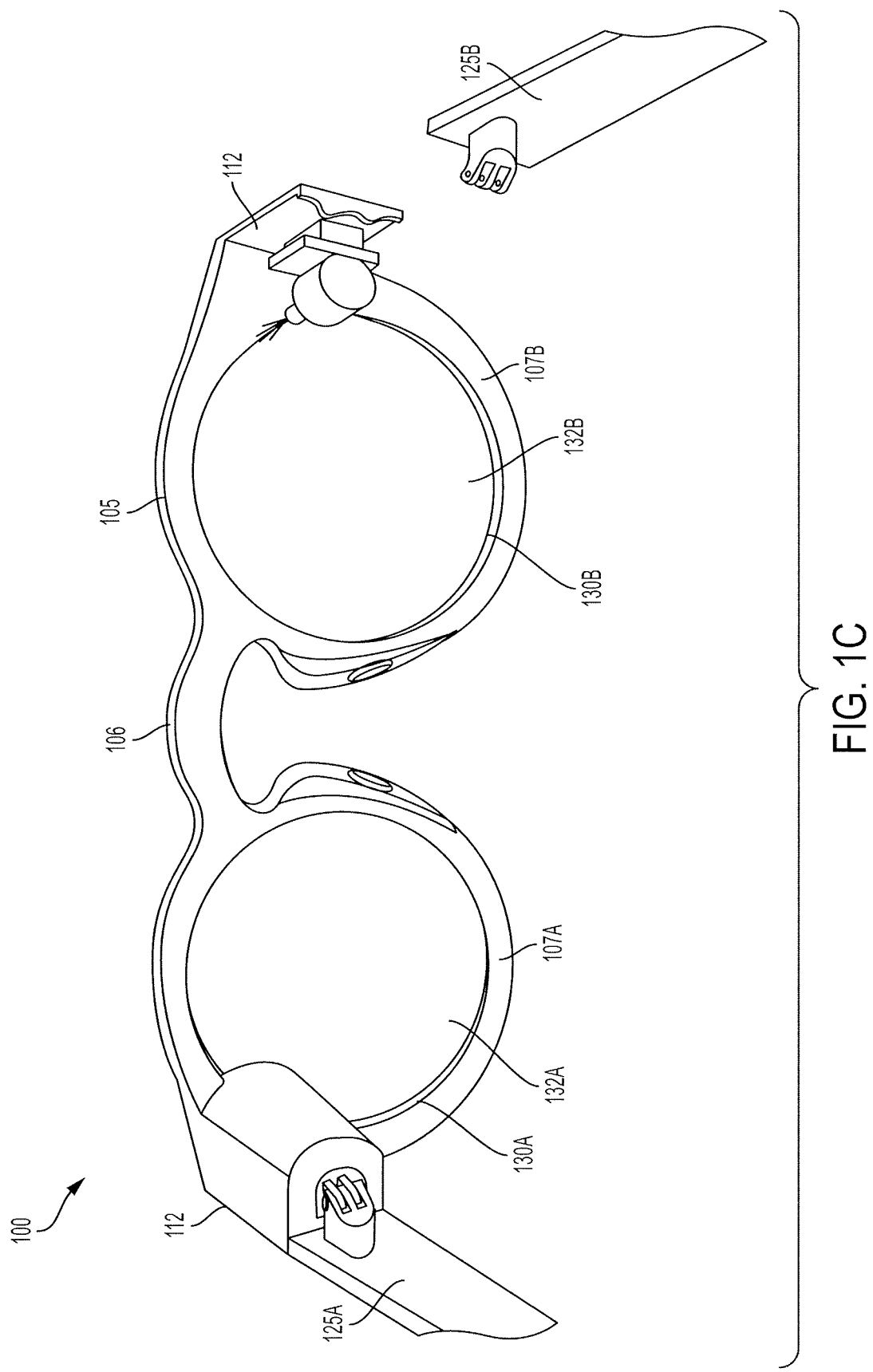

FIG. 1A is a side view of an example image capture device/camera configured as an eyewear device 100. Eyewear device 100 includes a button 110 on a temple 125B. The button 110 identifies a finger press for activating functions of the image capture device, such as activating an imager to switch to a record/capture mode. As shown in FIGS. 1A-1C, the eyewear device 100 is in a form configured for a user to wear. The eyewear device 100 can take other forms and may incorporate other types of frameworks, for example, a headgear, a headset, or a helmet.

In the illustrated example of FIGS. 1A-1C, eyewear device 100 includes a frame 105 having a left rim 107A connected to a right rim 107B via a bridge 106 adapted for a nose of the wearer. The left and right rims 107A and 107B include respective apertures 130A and 130B, which hold a respective optical assembly 132A and 132B. Optical assembly 132A and 132B can include various optical layers and/or an image display device.

Figure 2A:
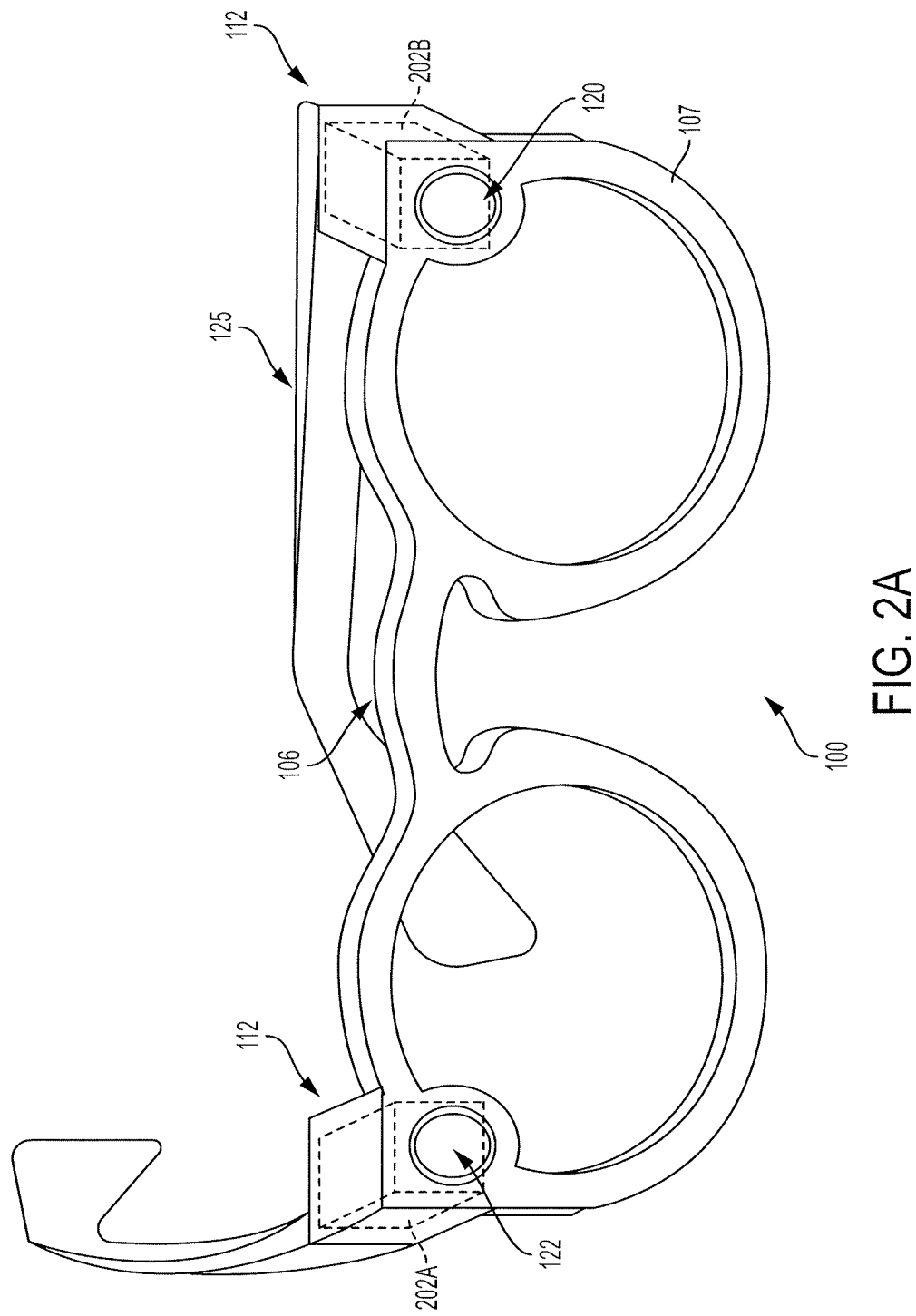
FIG. 2A is a front view of another example image capture device configured as an eyewear device according to aspects of the invention.
Figure 2B:
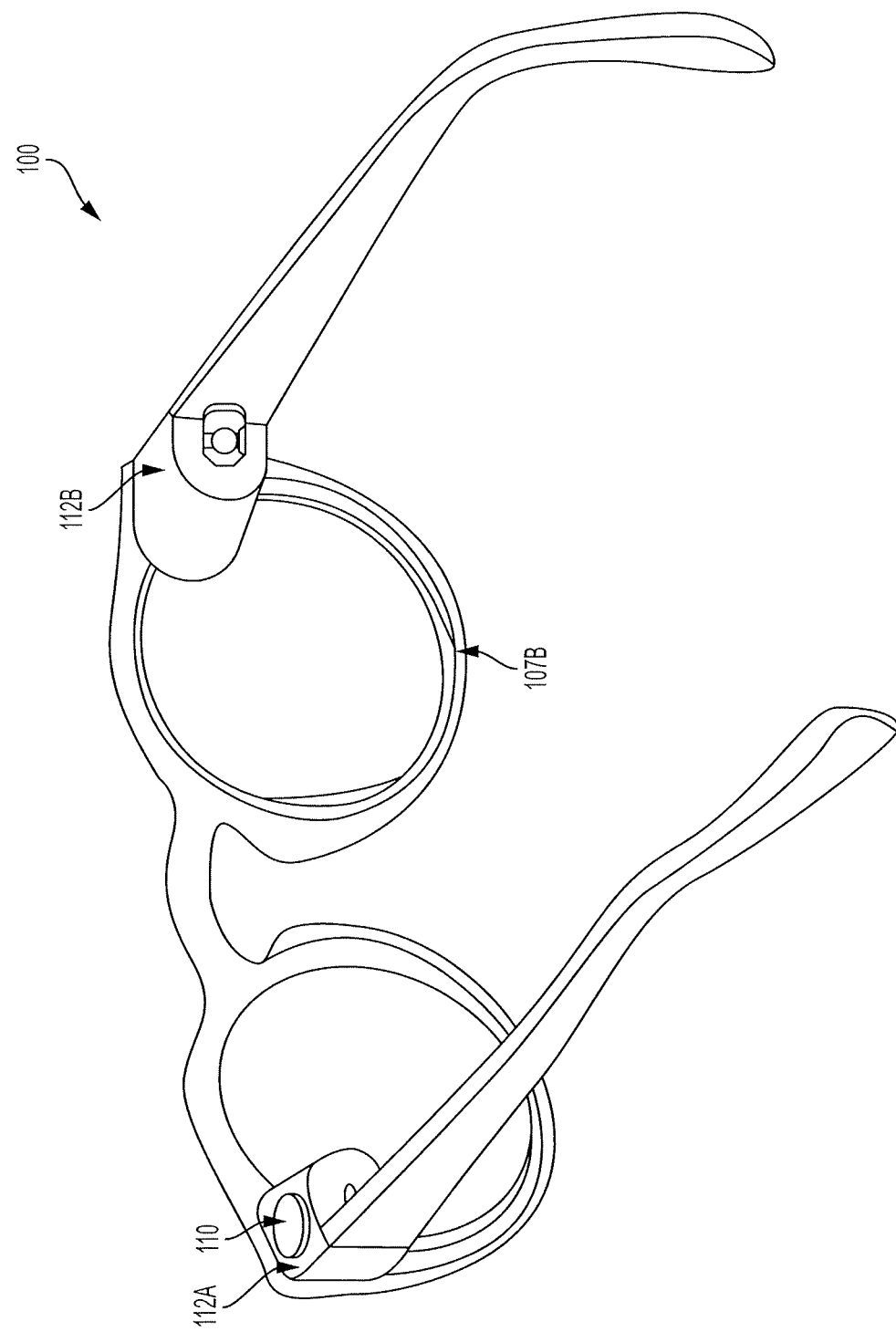
FIG. 2B is a rear view of the example image capture device of FIG. 2A.

Eyewear device 100 may include button(s) 110 on the frame 105, the temple 125A-B, and/or optional chunks 112A-B positioned between the frame and the temples. FIG. 2A depicts electronic components 202A and 202B within chunks 112. The electronic components may be positioned at other locations in or on the eyewear device 100. The electronic components 202A and 202B of the eyewear device 100 may include a processor, a memory accessible to the processor, and a sensing circuit that identifies a finger press of the button 110 (FIGS. 1A and 2B).

The eyewear device 100 includes programming in memory. Execution of the programming by a processor configures the eyewear device 100 to perform functions, including determining a frame rate for use by an auto exposure method that is based on ambient light levels and auto exposure methods for determining and setting optimal image capture parameters of an imager (e.g., sensor gain and exposure time). The processor may also be configured to execute functions relating to receiving an input from the user pressing the button 110. Additional functionalities may be formed by the processor, such as those described in U.S. Patent Application No. 62/615,664, which is incorporated herein in its entirety for all purposes.

The button 110 may be a physical button that, when pressed, sends a user input signal to the processor. Pressing the button 110 for a predetermined period of time (e.g., three seconds) may be processed by the processor as a request, e.g., to turn on the eyewear device (e.g., transition eyewear device 100 from an off or sleep mode of operation to a low power mode of operation) or to switch the imager to a record mode. In other examples, the button 110 may be a virtual button on the eyewear device 100 or a remote processing device.

As illustrated in FIG. 2A, eyewear device 100 includes at least one ambient light sensor 120 that is sensitive to ambient light and at least one imager 120 that is sensitive to the visible light range wavelengths. Ambient light sensor 120 may be formed of one or more sensory elements that are configured to sense an amount of light and/or brightness in the environment in a manner similar to or the same as a human's eye. Suitable examples of ambient light sensors 120 include, but are not limited to, dual-diode configurations, integrated broadband responding photodiode and infrared-responding photodiode in a CMOS integrated circuit, and the like.

Examples of suitable imagers 120 include a high resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the imager 120 may be captured along with geolocation data, digitized by an image processor, stored in a memory, and displayed on an image display device of an optical assembly.

Figure 3:
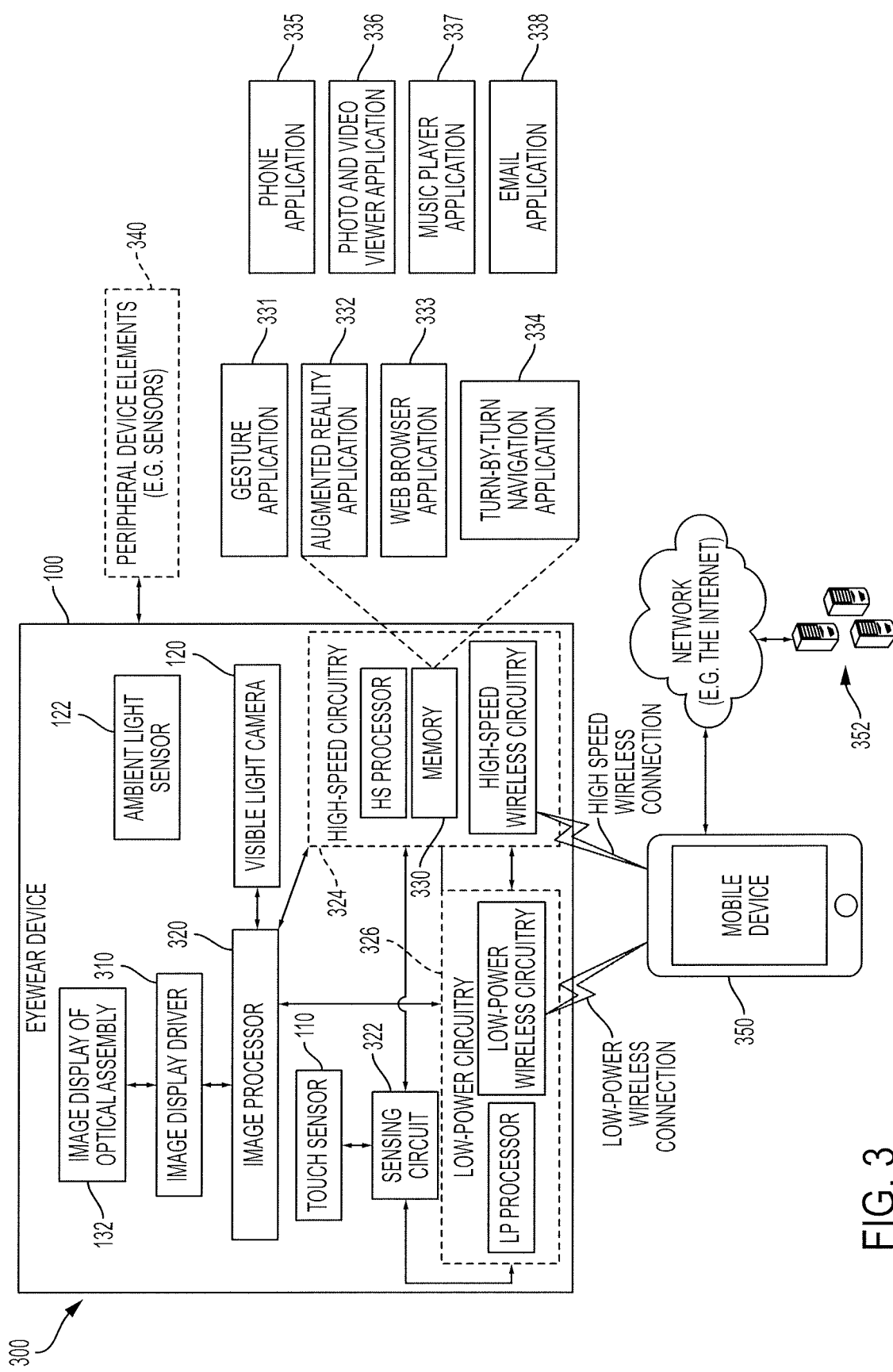
FIG. 3 is a schematic of an example image capture system in accordance with aspects of the invention.

FIG. 3 is a high-level schematic of an example image capture system 300 including the eyewear device 100. In addition to eyewear device 100, the system 300 may include a mobile device 350 and server system 352. Although FIG. 3 depicts the eyewear device 100 communicating with a network via a mobile device 350, it will be understood that eyewear device 100 may be configured to communicate directly with a network without the assistance of another computing device. Image processor 320 within eyewear device 100 includes circuitry to receive signals from ambient light sensor 122 and imager 120, and process those signals into a format suitable for storage in memory 330 or display by image display 132, mobile device 352, or other type of display.

In one example, image processor 320 includes a microprocessor integrated circuit ("IC") customized for processing sensor data from ambient light sensor 122 and imager 120, along with volatile memory used by the microprocessor to operate. Memory 330 may store software code for execution including coding to select initialization parameters (e.g., frame rate) for auto exposure algorithms, execute auto exposure algorithms to determine optimal image capture parameters (e.g., sensor gain and exposure time), switch the imager 120 to a record mode, and/or control the mode of operation of the electronic components 202A and 202B. System 300 may optionally include additional components, such as peripheral device elements 340. Suitable additional elements are described in U.S. patent application No. 62/615,664, which is incorporated herein in its entirety for all purposes.

Eyewear device 100 may additionally include an image display of the optical assembly 132, sensing circuit 322, image display driver 310, image processor 320, low-power circuitry 326, and/or high-speed circuitry 324. The components shown in FIG. 3 for the eyewear device 100 may be located on one or more circuit boards, for example a PCB or flexible PCB. The depicted components can be located in the temples, chunks, frames, hinges, and/or bridge of the eyewear device 100. Imager 120 can include digital camera elements such as a complementary metal-oxide-semiconductor ("CMOS") image sensor, charge coupled device, a lens, or any other respective visible or light capturing elements that may be used to capture data.

Memory 330 includes a storage device capable of storing data and/or various applications, such as, e.g., applications 331-338. While memory 330 is shown as integrated with high-speed circuitry 324, in other embodiments, memory 330 may be an independent standalone element of the eyewear device 100.

Figure 4:
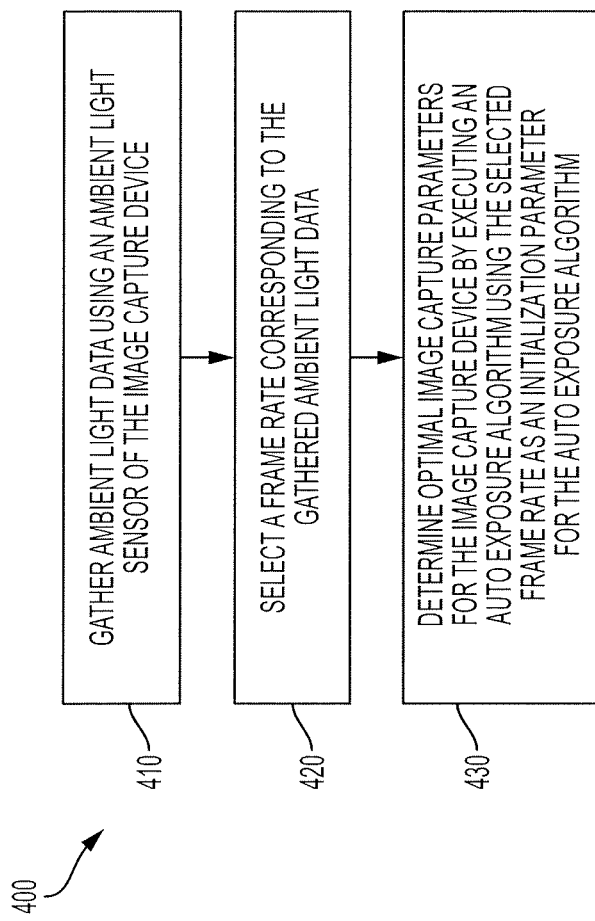
FIG. 4 is a flow chart of an example auto exposure method for an image capture device according to aspects of the invention.

FIG. 4 is a flow chart of an example auto exposure method 400 for an image capture device. Example auto exposure method 400 may be executed using one or more of the components or features described herein with respect to other examples.

In step 410, ambient light data is gathered using an ambient light sensor (e.g., ambient light sensor 122) of the image capture device. The ambient light sensor may be formed of one or a plurality of sensory elements that are configured to sense an amount of light and/or brightness in the environment in a manner similar to or the same as a human's eye. Suitable ambient light sensors include dual-diode configurations, integrated broadband responding photodiode and infrared-responding photodiode in a CMOS integrated circuit, and the like.

In step 420, a frame rate corresponding to the gathered ambient light data is selected. A processor, such as image processor 320, is configured to receive ambient light data gathered by the ambient light sensor. The processor may select a frame rate corresponding to the gathered ambient light data by comparing the ambient light data to a plurality of ambient light ranges in a look-up table. Each of the ambient light ranges may be associated with a frame rate, such that the processor may select the frame rate corresponding to the ambient light range that encompasses the ambient light data. For example, the look-up table may include at least two ambient light ranges, with each ambient light range associated with a mode for capturing an image. In another example, the look-up table may include three or more ambient light ranges, e.g., four ambient light ranges, five ambient light ranges, etc. In the example illustrated in FIG. 5, the look up table has three ambient light ranges, each associated with a different ambient light mode and corresponding to a different selected frame rate. An exemplary, non-limiting look up table is provided below.

| Ambient Light Sensor Readout Example | Mode | Selected Frame Rate |
|---|---|---|
| 100-9,999 | Low Light | 30 fps |
| 10,000-31,999 | Mid Light | 60 fps |
| 32,000-100,000 | Bright Light | 120 fps |

In step 430, optimal image capture parameters for the image capture device (e.g., sensor gain and exposure time) are determined by executing an auto exposure algorithm with a processor using the selected frame rate as an initialization parameter for the auto exposure algorithm. The auto exposure algorithm may utilize the selected frame rate based on the gathered ambient light data as the initialization parameter and then utilize iteratively gathered and compared imaging data gathered by an imager (e.g., imager 120) during a preview mode to iteratively determine signal strength/exposure levels across the imager. For example, the processor may select a frame rate based on the gathered ambient light data for the initialization parameter for use during a preview mode and then utilize the iteratively gathered (e.g., frame by frame) imaging data from the imager to determine a final correct exposure (e.g., sensor gain level and exposure time) for a capture/record mode. By determining the frame rate initially based on ambient light and then using that frame rate to gather frames of data for use during auto exposure, time is saved during the preview mode for mid and bright light conditions. This is because conventional systems utilize a low light level frame rate regardless of light conditions. The inventors have recognized that faster frame rates can be used for non-low light levels. This enables the system to gather signal strength/exposure levels from frame to frame at a faster rate, which results in faster convergence of the auto exposure algorithm. Suitable auto exposure algorithms include, but are not limited to, algorithms provided by AMBARELLA, Inc. of Santa Clara, California USA.

The examples of the invention are able to achieve faster convergence of the auto exposure algorithm on average by using the selected frame rate based on the gathered ambient light data as the initialization parameter and utilize imaging data iteratively gathered by an imager at the selected frame rate. This is because, rather than always starting with a relatively slow frame rate such as 30 frames per second, a faster frame rate such as 60 or 120 frames per second may be selected when ambient light conditions permit, which results in faster convergence of the auto exposure algorithm. Thus, in mid light level conditions where a frame rate of 60 frames per second can be used, frames of information can be gathered twice as fast. Accordingly, the auto exposure algorithm can achieve convergence 50% faster than an equivalent auto exposure algorithm in a conventional system. Likewise, in bright light level conditions where a frame rate of 120 frames per second can be used, frames of information can be gathered four times as fast. Accordingly, the auto exposure algorithm can achieve convergence 75% faster than an equivalent auto exposure algorithm in a conventional system. Methods and systems employing an example of the invention may achieve a boot to capture done time that is 20% faster on average than similar methods/systems that do not use the selected frame rate based on the gathered ambient light data as an initialization parameter. The boot to capture done time is the amount of time for booting up the host system, initializing the image capture system, setting up the auto exposure algorithm, waiting for the auto exposure algorithm to converge, and starting to record.

The processor may iteratively determine an input signal strength (where fidelity is a function of signal cleanness) from the gathered imaging data and converge the auto exposure algorithm utilizing the iteratively determined input signal strength at the determined frame rate. The processor is configured to switch the imager to a record mode and/or an image capture mode upon convergence of the auto exposure algorithm. In record mode, the processor may instruct the imager to gather data in real time. In image capture mode, the processor may instruct the imager to gather data sufficient to obtain an image. For example, the processor may activate the imager to capture at least one image, to capture a plurality of images, or to record a video. In one embodiment, the imager is activated by pressing a button on the image capture device.

Figure 5:
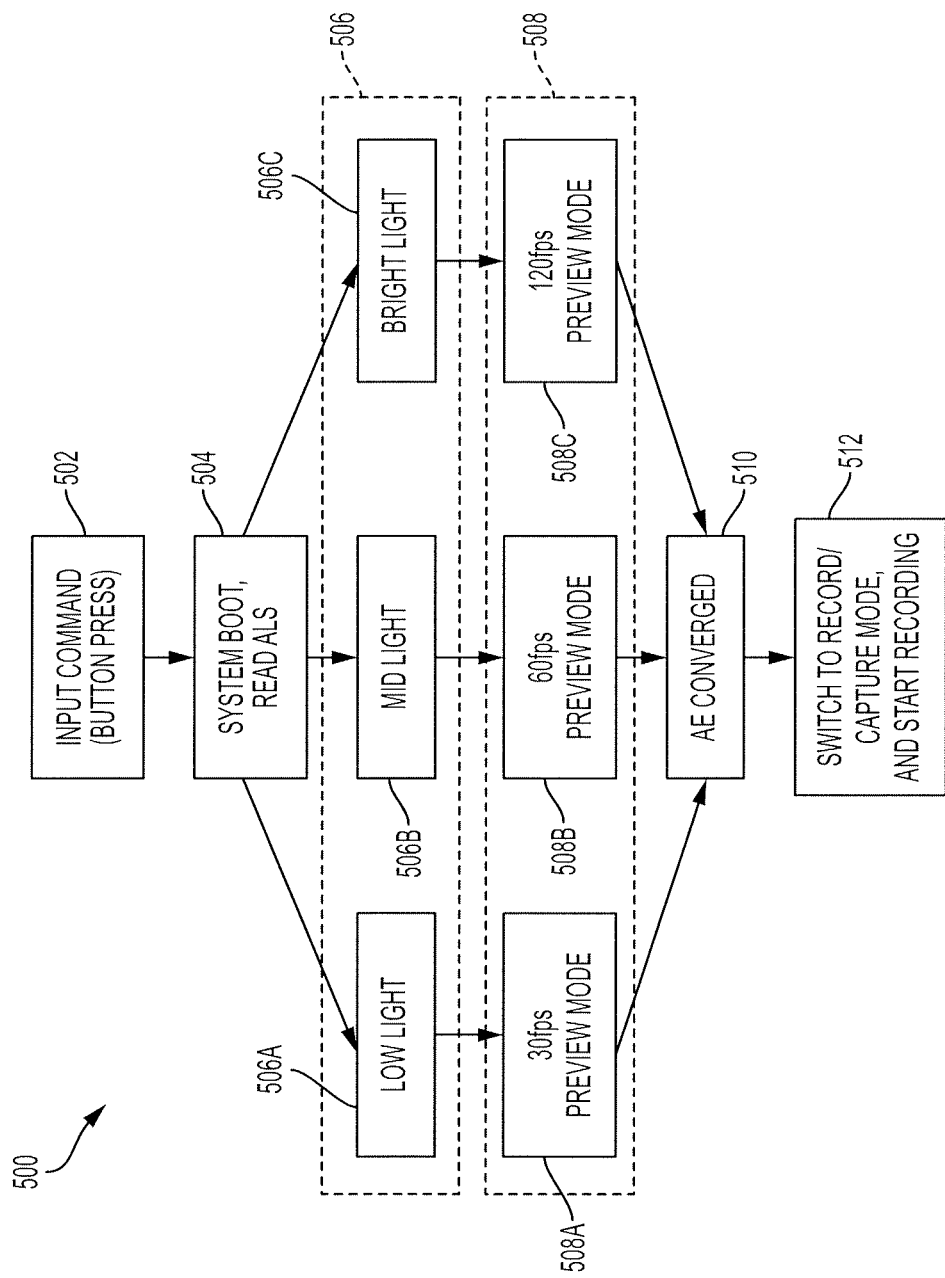
FIG. 5 is a flow chart of an example method for obtaining an image or recording using the auto exposure method of claim 4.

FIG. 5 depicts a flow chart of another example of an auto exposure method 500 for an image capture device. Example auto exposure method 500 may be executed using one or more of the components or features described herein with respect to other examples. At step 502, an input command such as a button press is detected (e.g., a press of button 110 by image processor 320. At step 504, the image system boots in response to the input command (e.g., image processor 320, ambient light sensor 122, and visible light camera 120) enables/transitioned from a sleep mode) and an ambient light level is read from the ambient light sensor (e.g., ambient light sensor 122). In an example, a real time operating system (RTOS) manages the ambient light sensor 122 in order to obtain ambient light level readings as quickly as possible.

At step 506, the image processor (e.g., image processor 320) determines the category of ambient light (e.g., low 506A, mid 506B, or bright 506C; see, for example, above non-limiting look up table) based on the ambient light level reading. At step 508, the image processor (e.g., image processor 320) determines the frame per second (fps) preview mode for initial use by the auto exposure algorithm based on the determined category of ambient light (e.g., 30 fps 508A for low, 60 fps 508B for mid, or 120 fps 508C for bright; see, for example, above non-limiting look up table).

At step 510, the image processor (e.g., image processor 320) executes the auto exposure algorithm using the determined fps preview mode as an initialization parameter until the auto exposure algorithm converges. At step 512, upon convergence of the auto exposure algorithm, the image processor (e.g., image processor 320) transitions to a record/capture mode for obtaining images having a proper exposure.

Transitioning to the record/capture mode typically involves changing the image sensor mode (e.g., to a different fps mode), which introduces timing overheads. If lighting conditions and the resulting signal quality are acceptable (e.g., the selected image sensor mode satisfies still capture resolution requirements), however, the fps selected as the initialization parameter for the auto exposure algorithm may be suitable for use during a still capture mode. The initialization frame rate therefore may be used in some examples to capture a still image without changing the image sensor mode, which results in time savings over conventional techniques where the image sensor mode is changed. Thus, the ambient light level sensed by the ambient light sensor may be used to select an image sensor mode to use for auto exposure (AE) convergence and for the entire end-to-end flow. For example, in a system with two still capture pipelines (e.g., 1. AE and capture using 30 fps and 2. AE and capture using 60 fps), the pipeline selection may be performed based on the ambient light level. In this example, both pipelines may deliver still captures of the same resolution as long as the image sensor satisfies the still capture resolution requirements for both 30 fps and 60 fps.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An auto exposure method for an image capture device that includes at least one ambient light sensor that is sensitive to ambient light and at least one imager that is sensitive to visible light, the method comprising:
   receiving ambient light data from the at least one ambient light sensor, the at least one ambient light sensor comprising one or more sensory elements;
   selecting a frame rate corresponding to the ambient light data, wherein the image capture device has a still capture mode comprising a first still capture pipeline associated with a first frame rate and a second still capture pipeline associated with a second frame rate that is different than the first frame rate;
   determining image capture parameters using the frame rate;
   receiving image data from the at least one imager, the image data generated according to the image capture parameters, the at least one imager comprising a plurality of pixels, wherein the plurality of pixels of the at least one imager are separate from the one or more sensory elements of the at least one ambient light sensor; and
   updating the image capture parameters using the image data.

2. The method of claim 1, wherein the image capture device further has a preview mode for previewing images, and wherein the imager is configured to generate the imaging data iteratively at the selected frame rate during the preview mode.

3. The method of claim 2, wherein the image capture device further has a record mode for obtaining images, wherein the image data is determined by using an auto exposure algorithm, and wherein the imager is further configured to transition to the still capture mode or the record mode from the preview mode after the auto exposure algorithm converges.

4. The method of claim 3, wherein the imager is configured to generate the image data according to the selected frame rate in the still capture mode and to generate the image data according to the image capture parameters in the record mode.

5. The method of claim 1, wherein the selecting step comprises:
   comparing the ambient light data to a plurality of ambient light ranges in a look up table, each ambient light range associated with a frame rate; and
   selecting the frame rate corresponding to the ambient light range that encompasses the ambient light data.

6. The method of claim 1, wherein the image data is determined by executing an auto exposure algorithm and executing the auto exposure algorithm comprises:
   iteratively determining an input signal strength from the imaging data; and
   converging the auto exposure algorithm utilizing the iteratively determined input signal strength.

7. An image capture device comprising:
   at least one ambient light sensor that is sensitive to ambient light, the at least one ambient light sensor comprising one or more sensory elements;

at least one imager that is sensitive to a visible light range, the at least one imager comprising a plurality of pixels, wherein the plurality of pixels of the at least one imager are separate from the one or more sensory elements of the at least one ambient light sensor; and a processor coupled to the at least one ambient light sensor and the at least one imager, the processor configured to:

obtain ambient light data from the at least one ambient light sensor;

select a frame rate corresponding to the ambient light data, wherein the image capture device has a still capture mode comprising a first still capture pipeline associated with a first frame rate and a second still capture pipeline associated with a second frame rate that is different than the first frame rate;

determine image capture parameters using the frame rate;

receive image data from the at least one imager, the image data generated according to the image capture parameters; and update the image capture parameters using the image data.

8. The image capture device of claim 7, wherein the image capture device further has a preview mode for previewing images, and wherein the imager is configured to generate the imaging data iteratively at the selected frame rate during the preview mode.

9. The image capture device of claim 8, wherein the image capture device further has a record mode for obtaining images, wherein the image data is determined by using an auto exposure algorithm, and wherein the imager is further configured to transition to the still capture mode or the record mode from the preview mode after the auto exposure algorithm converges.

10. The image capture device of claim 9, wherein the imager is configured to generate the image data according to the selected frame rate in the still capture mode and to generate the image data according to the image capture parameters in the record mode.

11. The image capture device of claim 7, wherein the processor selects the frame rate by:

comparing the ambient light data to a plurality of ambient light ranges in a look up table, each ambient light range associated with a frame rate; and selecting the frame rate corresponding to the ambient light range that encompasses the ambient light data.

12. The image capture device of claim 7, wherein the image data is determined by execution of an auto exposure algorithm and execution of the auto exposure algorithm configures the image capture device to:

iteratively determine an input signal strength from the imaging data; and converge the auto exposure algorithm utilizing the iteratively determined input signal strength.

13. A non-transitory computer readable storage medium including instructions for execution by a processor of an image capture device that includes at least one ambient light sensor that is sensitive to ambient light and at least one imager that is sensitive to visible light, the instructions, when executed, configure the image capture device to:

receive ambient light data from the at least one ambient light sensor, the at least one ambient light sensor comprising one or more sensory elements;

select a frame rate corresponding to the ambient light data, wherein the image capture device has a still capture mode comprising a first still capture pipeline associated with a first frame rate and a second still capture pipeline associated with a second frame rate that is different than the first frame rate;

determine image capture parameters using the frame rate;

receive image data from the at least one imager, the image data generated according to the image capture parameters, the at least one imager comprising a plurality of pixels, wherein the plurality of pixels of the at least one imager are separate from the one or more sensory elements of the at least one ambient light sensor; and update the image capture parameters using the image data.

14. The medium of claim 13, wherein the image capture device further has a preview mode for previewing images, and wherein the imager is configured to generate the imaging data iteratively at the selected frame rate during the preview mode.

15. The medium of claim 14, wherein the image capture device further has a record mode for obtaining images, wherein the image data is determined by using an auto exposure algorithm, and wherein the imager is further configured to transition to the still capture mode or the record mode from the preview mode after the auto exposure algorithm converges.

16. The medium of claim 15, wherein the imager is configured to generate the image data according to the selected frame rate in the still capture mode and to generate the image data according to the image capture parameters in the record mode.

17. The medium of claim 13, wherein the image data is determined by execution of an auto exposure algorithm and execution of the auto exposure algorithm configures the image capture device to:

iteratively determining an input signal strength from the imaging data; and converging the auto exposure algorithm utilizing the iteratively determined input signal strength.

18. The medium of claim 13, wherein the frame rate is selected by:

comparing the ambient light data to a plurality of ambient light ranges in a look up table, each ambient light range associated with a frame rate; and selecting the frame rate corresponding to the ambient light range that encompasses the ambient light data.

* * * * *